(12) United States Patent
Nishi et al.

(10) Patent No.: US 8,822,735 B2
(45) Date of Patent: Sep. 2, 2014

(54) PROCESS FOR THE PREPARATION OF POLYGLYCERYL ETHER DERIVATIVES

(75) Inventors: Takafumi Nishi, Wakayama (JP); Mitsuru Uno, Wakayama (JP); Akira Saito, Wakayama (JP); Yuichiro Seki, Wakayama (JP); Goushi Yamamoto, Wakayama (JP)

(73) Assignee: Kao Corporation, Tokyo (JP)

( * ) Notice: Subject to any disclaimer, the term of this patent is extended or adjusted under 35 U.S.C. 154(b) by 456 days.

(21) Appl. No.: 13/146,546

(22) PCT Filed: Jan. 28, 2010

(86) PCT No.: PCT/JP2010/051115
§ 371 (c)(1),
(2), (4) Date: Jul. 27, 2011

(87) PCT Pub. No.: WO2010/087395
PCT Pub. Date: Aug. 5, 2010

(65) Prior Publication Data
US 2011/0282103 A1 Nov. 17, 2011

(30) Foreign Application Priority Data

Jan. 29, 2009 (JP) .................. 2009-017723
Jan. 26, 2010 (JP) .................. 2010-014604

(51) Int. Cl.
C07C 43/13 (2006.01)
C08G 65/22 (2006.01)
C08G 65/26 (2006.01)

(52) U.S. Cl.
CPC ............ *C08G 65/22* (2013.01); *C08G 65/2609* (2013.01); *C08G 65/2657* (2013.01)
USPC ......................................... 568/622; 568/618

(58) Field of Classification Search
CPC ....... C07C 41/03; C07C 43/11; B01J 2231/48
USPC ............................................... 568/618, 622
See application file for complete search history.

(56) References Cited

U.S. PATENT DOCUMENTS

| 2,089,569 A | * | 8/1937 | Claus Heuck et al. | ........ 554/223 |
| 3,821,372 A | * | 6/1974 | Vanlerberghe et al. | ....... 514/786 |
| 5,723,696 A | | 3/1998 | Roberts et al. | |
| 2003/0092879 A1 | | 5/2003 | Sunder et al. | |
| 2004/0254337 A1 | | 12/2004 | Meurs | |
| 2008/0085980 A1 | | 4/2008 | Sakanishi | |
| 2009/0275784 A1 | | 11/2009 | Saito | |

FOREIGN PATENT DOCUMENTS

| CN | 101326149 A | 12/2008 |
| JP | 8-506137 | 7/1996 |
| JP | 9 508434 | 8/1997 |
| JP | 9-508434 | 8/1997 |
| JP | 2003 183383 | 7/2003 |
| JP | 2005 509707 | 4/2005 |
| JP | 2007-63210 | 3/2007 |
| JP | 2008 69220 | 3/2008 |
| WO | WO 94/18259 A1 | 8/1994 |
| WO | WO 95/21210 A1 | 8/1995 |
| WO | WO 2007/066723 | 6/2007 |
| WO | 2007 075927 | 7/2007 |

OTHER PUBLICATIONS

Extended European Search Report issued Jan. 2, 2013, in European Patent Application No. 10735860.8.
International Search Report issued Apr. 13, 2010 in PCT/JP10/51115 filed Jan. 28, 2010.
Chinese Office Action issued Oct. 15, 2012, in China Patent Application No. 201080005723.0 (with English translation).

\* cited by examiner

*Primary Examiner* — Rosalynd Keys
(74) *Attorney, Agent, or Firm* — Oblon, Spivak, McClelland, Maier & Neustadt, L.L.P.

(57) ABSTRACT

The present invention relates to a process for producing polyglyceryl ether derivatives in which the polyglyceryl ether derivatives are produced from an alcohol (except for glycidol and glycerol) and glycidol in the presence of an aluminosilicate which is ion-exchanged with at least one cation selected from the group consisting of ammonium ions, alkali metal ions and alkali earth metal ions. In the process of the present invention, a removal step of the catalyst can be simplified, and the polyglyceryl ether derivatives can be produced in an economical and efficient manner.

12 Claims, No Drawings

PROCESS FOR THE PREPARATION OF POLYGLYCERYL ETHER DERIVATIVES

CROSS REFERENCE TO RELATED APPLICATION

This application is a 371 of PCT/JP10/051115, filed on Jan. 28, 2010, and claims priority to the following Japanese Patent Applications: 2009-017723, filed on Jan. 29, 2009; and 2010-014604, filed on Jan. 26, 2010.

FIELD OF THE INVENTION

The present invention relates to a process for producing polyglyceryl ether derivatives, and more particularly, to a process for producing polyglyceryl ether derivatives in the presence of an aluminosilicate.

BACKGROUND OF THE INVENTION

Polyglyceryl ether derivatives exhibit excellent properties as a nonionic surfactant, and have been used in various applications such as food, cosmetics, perfumes, agricultural chemicals and drugs for the purposes of emulsification, solubilization, dispersion, cleaning, foaming, defoaming, penetration, antibacterial effect, etc.

For example, PCT pamphlet WO 2007/066723, etc., disclose a process for producing polyglyceryl ether derivatives in which an alcohol and glycidol are subjected to addition reaction in the presence of a homogeneous catalyst such as La-based catalysts.

However, the above conventional process using the homogeneous catalyst tends to need such a complicated procedure in which after completion of the reaction, the obtained reaction mixture must be dissolved in a large amount of an organic solvent to remove the catalyst therefrom by means of an ion exchange resin, etc., and then the solvent must be further removed from the reaction mixture by distillation, etc. In addition, the process has the problems such as large burden on facilities used therein.

In general, there are known various reactions using a solid catalyst. For example, JP 2007-63210A, JP 9-508434A and JP 8-506137A respectively disclose a process for producing polyglycerol in the presence of a catalyst such as activated carbon and zeolite. In addition, for example, PCT pamphlet WO 2006/085485 discloses a process for producing a polyglyceryl ether derivative from an alcohol and glycidol in the presence of activated carbon as the solid catalyst.

SUMMARY OF THE INVENTION

The present invention relates to a process for producing a polyglyceryl ether derivative, including the step of reacting an alcohol (except for glycidol and glycerol) with glycidol in the presence of an aluminosilicate whose hydrogen ions are partially or wholly ion-exchanged with at least one cation selected from the group consisting of ammonium ions and cations of metal elements.

DETAILED DESCRIPTION OF THE INVENTION

However, in the conventional production process using activated carbon as the solid catalyst, polyglycerol tends to be produced as a by-product by polymerization between molecules of glycidol, which results in poor yield of the polyglyceryl ether derivative. In addition, once the polyglycerol is produced, there tends to occur such a problem that the activated carbon is hardly separated from the polyglyceryl ether derivative as the aimed product.

Thus, the present invention relates to a process for producing a polyglycerol ether derivative from alcohols and glycidols using a specific aluminosilicate. Further, the present invention relates to a process for producing a polyglycerol ether derivative in which a removal step of the catalyst can be simplified, and the polyglycerol ether derivative can be produced in an economical and efficient manner.

More specifically, the present invention relates to a process for producing a polyglycerol ether derivative which includes the step of reacting an alcohol (except for glycidol and glycerol) with glycidol in the presence of an aluminosilicate whose hydrogen ions are partially or wholly ion-exchanged with at least one cation selected from the group consisting of ammonium ions and cations of metal elements (hereinafter referred to merely as "cations"). The "polyglyceryl ether derivative" as used herein means a compound containing a polyglycerol moiety constituted from one glycerol residue or two or more glycerol residues continuously bonded to each other, and a hydrocarbon group such as an alkyl group.

(Alcohols)

The alcohol used in the present invention includes alcohols except for glycidol and glycerol. From the viewpoint of a good reactivity, the alcohol is preferably a compounds represented by the following general formula (1);

$$R^1-(OA^1)_n-(OA^2)_m-OH \quad (1)$$

wherein $R^1$ is a hydrocarbon group having 1 to 36 carbon atoms; $A^1$ is a linear or branched alkanediyl group having 2 to 4 carbon atoms; $A^2$ is a hydroxyl group-containing linear or branched alkanediyl group having 2 to 4 carbon atoms; and n and m represent mass-average polymerization degrees of the $OA^1$ group and the $OA^2$ group, respectively, in which n is a number of from 0 to 20 and m is a number of from 0 to 2.

In the general formula (1), $R^1$ is a saturated or unsaturated, linear, branched or cyclic hydrocarbon group having 1 to 36 carbon atoms. As the hydrocarbon group, from the viewpoint of good properties of the resulting polyglyceryl ether derivative, there are preferably used (i) linear, branched or cyclic alkyl groups having 4 to 24 carbon atoms and preferably 8 to 18 carbon atoms; (ii) linear, branched or cyclic alkenyl groups having 2 to 36 carbon atoms, preferably 4 to 24 carbon atoms and more preferably 8 to 18 carbon atoms; and (iii) substituted or unsubstituted aromatic groups having 6 to 24 carbon atoms.

Specific examples of the alkyl groups as $R^1$ include methyl, ethyl, n-propyl, isopropyl, various butyl groups, various pentyl groups, various hexyl groups, various octyl groups, various decyl groups, various dodecyl groups, various tetradecyl groups, various hexadecyl groups, various octadecyl groups, various icosyl groups, various tetracosyl groups, various triacontyl groups, and cyclopentyl, cyclohexyl and cyclooctyl groups. Meanwhile, the "various" groups as used herein mean all of linear, branched and cyclic groups. In the case of the branched group, the number and positions of branched chains thereof are not particularly limited.

Specific examples of the alkenyl groups as RI include propenyl, allyl, 1-butenyl, isobutenyl, various hexenyl groups, various octenyl groups, various decenyl groups, various dodecenyl groups, and oleyl, cyclopentenyl, cyclohexenyl and cyclooctenyl groups.

Specific examples of the aromatic groups as $R^1$ include phenyl, naphthyl, 2-methyl phenyl, 3-methyl phenyl, 4-methyl phenyl, 2-methoxyphenyl, 3-methoxyphenyl, 4-methoxyphenyl and 4-nitrophenyl.

In the general formula (1), $A^1$ is a linear or branched alkanediyl group having 2 to 4 carbon atoms. Specific example of the alkanediyl group as $A^1$ include an ethylene group, a trimethylene group, a propane-1,2-diyl group, a tetramethylene group and a butane-1,3-diyl group.

In the general formula (1), $A^2$ is a hydroxyl group-containing linear or branched alkanediyl group having 2 to 4 carbon atoms. Specific example of the hydroxyl group-containing alkanediyl group as $A^1$ include a hydroxy-propane-1,2-diyl group and a hydroxy-butane-1,3-diyl group.

In addition, n and m represent mass-average polymerization degrees of the $OA^1$ group and the $OA^2$ group as oxyalkanediyl groups, respectively. From the viewpoint of good properties of the resulting polyglyceryl ether derivative, n is a number of from 0 to 20, preferably from 0 to 8 and more preferably 0, and m is a number of from 0 to 2. When n and m are 2 or more, the plural $OA^1$ groups and the plural $OA^2$ groups may be respectively the same or different.

Specific examples of the alcohol represented by the general formula (1) include the following alcohols (i) to (iv);

(i) aliphatic alcohols such as methyl alcohol, ethyl alcohol, propyl alcohol, isopropyl alcohol, pentyl alcohol, isopentyl alcohol, hexyl alcohol, cyclohexyl alcohol, 2-ethylhexyl alcohol, octyl alcohol, decyl alcohol, lauryl alcohol, myristyl alcohol, palmityl alcohol, stearyl alcohol, isostearyl alcohol and oleyl alcohol;

(ii) aromatic alcohols such as phenol, methoxyphenol and naphthol;

(iii) monoalkyl ethers of mono- or poly-alkylene glycols such as ethylene glycol monomethyl ether, ethylene glycol monohexyl ether, ethylene glycol monododecyl ether, ethylene glycol monostearyl ether, propylene glycol monomethyl ether, propylene glycol monohexyl ether, propylene glycol monooctyl ether, propylene glycol monododecyl ether, polyethylene glycol monododecyl ether, polyethylene glycol monomyristyl ether, polyethylene glycol monopalmityl ether and polypropylene glycol monododecyl ether; and (iv) mono- or di-glyceryl ethers such as ethyl glyceryl ether, hexyl glyceryl ether, 2-ethylhexyl glyceryl ether, octyl glyceryl ether, decyl glyceryl ether, lauryl glyceryl ether, stearyl glyceryl ether, isostearyl glyceryl ether and diglycerol monododecyl ether, or ethylene glycol monododecyl monoglyceryl ether.

Among the above-exemplified specific alcohols, from the viewpoint of a good utilizability of the resulting polyglyceryl ether derivative, preferred are aliphatic alcohols having 8 to 18 carbon atoms such as octyl alcohol, 2-ethylhexyl alcohol, decyl alcohol, lauryl alcohol, myristyl alcohol, palmityl alcohol, stearyl alcohol and isostearyl alcohol, and monoglyceryl ethers such as 2-ethylhexyl glyceryl ether, octyl glyceryl ether, decyl glyceryl ether, lauryl glyceryl ether, myristyl glyceryl ether, palmityl glyceryl ether, stearyl glyceryl ether and isostearyl glyceryl ether; more preferred are aliphatic alcohol having 10 to 16 carbon atoms; and especially preferred is lauryl alcohol.

These alcohols may be used alone or in combination of any two or more thereof.

(Aluminosilicate)

In the present invention, the reaction between the alcohol (except for glycidol and glycerol) and glycidol is carried out in the presence of an aluminosilicate whose hydrogen ions are partially or wholly ion-exchanged with at least one cation selected from the group consisting of ammonium ions and cations of metal elements.

Examples of the ammonium ions as the cations with which the hydrogen ions of the aluminosilicate are to be ion-exchanged, include ions such as an ammonium ion, a primary ammonium ion, a secondary ammonium ion, a tertiary ammonium ion, a quaternary ammonium ion and a pyridinium ion. From the viewpoints of a good availability and a facilitated preparation of the aluminosilicate, among these ammonium ions, preferred are an ammonium ion and a pyridinium ion.

Examples of the cations of the metal elements include cations of typical metal elements belonging to Groups 1A, 2A, 2B and 3B of a long-form Periodic Table (corresponding to Groups 1, 2, 12 and 13 of IUPAC Periodic Table) and cations of transition metal elements belonging to Groups 3A to 7A, 8 and 1B of a long-form Periodic Table (corresponding to Groups 3 to 11 of IUPAC Periodic Table). Among these cations of the metal elements, from the viewpoint of suppressing production of polyglycerol as a by-product, preferred is at least one cation selected from the group consisting of monovalent cations and divalent cations, and more preferred is at least one cation selected from the group consisting of alkali metal ions and alkali earth metal ions.

Specific examples of the alkali metal ions include ions of sodium, potassium, rubidium, cesium, etc. Among these alkali metal ions, from the viewpoints of a good availability and a facilitated preparation of the aluminosilicate, preferred are a sodium ion, a potassium ion and a cesium ion.

Specific examples of the alkali earth metal ions include ions of magnesium, calcium, strontium, barium, etc. Among these alkali earth metal ions, from the viewpoints of a good availability and a facilitated preparation of the aluminosilicate, preferred are a magnesium ion and a calcium ion.

As the cation with which the hydrogen ions of the above aluminosilicate are to be ion-exchanged, in view of a good reaction selectivity of glycidol, preferred cations are a pyridinium ion, a sodium ion, a potassium ion, a cesium ion, a magnesium ion and a calcium ion, and especially preferred ions are a pyridinium ion, a sodium ion, a potassium ion and a cesium ion.

The hydrogen ions present in the aluminosilicate are electrostatically bonded to an aluminum atom (Al) which is partially negatively charged in the aluminosilicate. The proportion (amount) of the hydrogen ions in the aluminosilicate which are ion-exchanged with the ammonium ions or the cations of the metal elements may be evaluated from a molar ratio of nitrogen or metal element to aluminum [(nitrogen/Al) or (metal element/Al)] which is determined by subjecting the aluminosilicate to a high-frequency inductively coupled plasma atomic emission spectrometry (ICP-AES).

Accordingly, in the present invention, the proportion (amount) of the hydrogen ions ion-exchanged with the cations in the aluminosilicate may also be evaluated from a sum of the above two molar ratios (hereinafter collectively referred to as "(cations/Al)ratio"). Thus, the proportion (amount) of the hydrogen ions ion-exchanged with the cations in the aluminosilicate may be evaluated from the (cations/Al)ratio(=(nitrogen/Al)+(metal element/Al)). The metal element as used herein preferably includes those except for aluminum.

The molar ratio of the cations to Al((cations/Al)ratio) in the aluminosilicate whose hydrogen ions are partially or wholly ion-exchanged with the ammonium ions and the cations of the metal elements is preferably from 0.10 to 10, more preferably from 0.15 to 5, still more preferably from 0.20 to 4 and especially preferably from 0.25 to 3 from the viewpoint of suppressing production of polyglycerol.

The aluminosilicate used in the present invention is preferably crystalline. However, in the present invention, a non-crystalline aluminosilicate may also be suitably used. In the present invention, from the viewpoints of suppressing production of polyglycerol and enhancing a conversion rate of the alcohol, zeolite is preferably used as the aluminosilicate. The zeolite usable in the present invention is at least one zeolite selected from the group consisting of a Y-type zeolite, a β-type zeolite, a mordenite-type zeolite and ZSM-5. Among these zeolites, preferred is at least one zeolite selected from the group consisting of a Y-type zeolite and a mordenite-type zeolite.

The molar ratio of an aluminum atom (Al) to a silicon atom (Si) (Al/Si) in the aluminosilicate is more than 0 and 0.5 or less, preferably from 0.0001 to 0.5, more preferably from 0.0005 to 0.1 and still more preferably from 0.001 to 0.01 from the viewpoints of suppressing production of polyglycerol and enhancing a conversion rate of the alcohol.

The shape of the aluminosilicate is not particularly limited, and the aluminosilicate may be of any shape, e.g., may be in the form of a powder or pellets obtained by molding the powder. The aluminosilicate in the form of a powder has an average particle size (median diameter) of from 0.1 μm to 1 mm, more preferably from 0.5 to 100 μm, still more preferably from 0.8 to 80 μm and further still more preferably from 1 to 50 μm from the viewpoints of a good reactivity between the alcohol and glycidol and facilitated separation of the aluminosilicate after the reaction.

The aluminosilicate used in the present invention has a structure in which a part or a whole of protons in a protonic acid-type aluminosilicate are ion-exchanged with the ammonium ions or the cations of the metal elements. More specifically, the above ion exchange procedure for obtaining the aluminosilicate used in the present invention is carried out by the method of neutralizing the protonic acid-type aluminosilicate with an amine compound, or the method of ion-exchanging the protonic acid-type aluminosilicate with nitrates, etc.

The amount of the aluminosilicate used in the production process of the present invention is usually from 0.01 to 200% by mass, preferably from 0.1 to 100% by mass and more preferably from 1 to 50% by mass on the basis of the alcohol from the viewpoints of a high productivity, suppression of production of by-products and enhanced conversion rate of the alcohol.

(Production of Polyglyceryl Ether Derivative)

In the present invention, the alcohol (except for glycidol and glycerol) and the glycidol represented by the following formula (2) are reacted with each other in the presence of the above aluminosilicate. When using the compound represented by the above general formula (1) as the alcohol, the polyglyceryl ether derivative represented by the following general formula (3) is produced as shown in the following reaction formula.

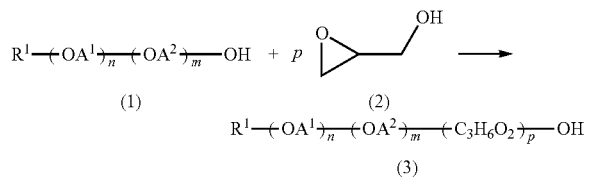

In the general formula (3), $R^1$, $A^1$, $A^2$, n and m are the same as those defined above; $(C_3H_6O_2)_p$ represents a polyglycerol moiety produced by the addition reaction of glycidol wherein p is a mass-average polymerization degree of a glycerol residue in the polyglycerol moiety. Also, the preferred ranges of $R^1$, $A^1$, $A^2$, n and m are also the same as those described above. From the viewpoint of a high productivity and a good utilizability of the resulting polyglyceryl ether derivative, a sum of m and p is preferably from 0.5 to 20, more preferably from 1 to 12 and still more preferably from 1 to 6.

The specific structure of the polyglyceryl moiety may include one or more structures selected from the group consisting of those represented by the following formulae.

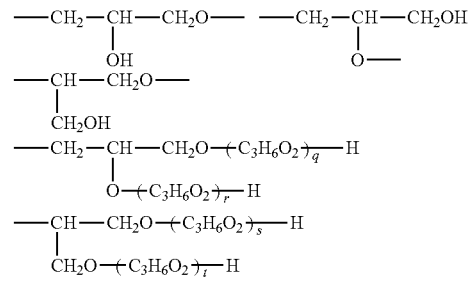

wherein q, r, s and t are respectively an integer of 1 or more; and $(C_3H_6O_2)$ has the same meaning as defined in the above $(C_3H_6O_2)_p$.

The proportions of the alcohol represented by the general formula (1) and the glycidol represented by the formula (2) which are used in the above reaction may be appropriately determined according to a desired mass-average polymerization degree p of the obtained polyglyceryl ether derivative represented by the general formula (3). From the viewpoints of a high productivity and a good utilizability of the resulting polyglyceryl ether derivative, the glycidol represented by the formula (2) is preferably used in an amount of from 0.5 to 30 mol, more preferably from 1 to 20 mol and still more preferably from 1 to 12 mol per 1 mol of the alcohol represented by the general formula (1).

The reaction between the alcohol and glycidol is an exothermic reaction. Therefore, in the present invention, the reaction is preferably gradually carried out by continuously dropping glycidol to the alcohol or intermittently adding divided parts of glycidol thereto, while stirring the alcohol.

When continuously dropping glycidol to the alcohol, the dropping rate of glycidol is preferably 1% by mass/min or less, more preferably 0.7% by mass/min or less and still more preferably 0.4% by mass/min or less on the basis of the alcohol to be charged.

When intermittently adding divided parts of glycidol to the alcohol, a total amount of glycidol to be added is equally divided into preferably two or more parts, more preferably 3 or more parts and still more preferably 4 or more parts, and the divided parts of glycidol are added to the alcohol at equal intervals such that the addition rate thereof falls within the above specified range as a whole. From the industrial viewpoints, glycidol is preferably added in about 2 to 5 divided parts, although the number of the divided parts of glycidol may vary depending upon the total amount of glycidol to be added, etc.

The time required for continuously dropping glycidol or intermittently adding divided parts of glycidol may also vary depending upon the total amount of glycidol to be added, etc., and is preferably from 1 to 50 h, more preferably from 2 to 20 h and still more preferably from 2 to 10 h from the industrial viewpoints.

In addition, after completing the addition of glycidol, the reaction system may be kept under the same condition over a period of from 0.1 to 20 h for aging thereof. Also, the dropping of glycidol and the aging may be alternately repeated.

(Reaction Conditions)

The reaction temperature used in the present invention may be appropriately determined according to kind of the alcohol used, kind and amount of the aluminosilicate used, etc. More specifically, from the viewpoints of reaction time, reaction efficiency, yield and quality of the resultant product, the reaction temperature is preferably from 100 to 250° C., more preferably from 150 to 230° C. and still more preferably from 180 to 210° C.

The pressure in the reaction system is not particularly limited, and the reaction may be carried out either under normal pressures or under applied pressures.

The gauge pressure in the reaction system is preferably in the range of from 0.1 to 10 MPa and more preferably from 0.3 to 0.9 MPa from the viewpoint of a high yield of the obtained polyglyceryl ether derivative. The effect of increasing the yield owing to the applied pressures is especially remarkable on a high-temperature side where the amount of polyglycerol by-produced increases. Therefore, when the reaction system is kept under applied pressures, it is possible to suppress production of polyglycerol even at an elevated temperature, so that the reaction time can be shortened even when using a low-activity catalyst.

The reaction system may be pressurized by filling an inert gas such as a nitrogen gas, a helium gas and an argon gas into the reaction system. Among these inert gases, the nitrogen gas is preferably used.

In the present invention, from the viewpoints of suppressing production of by-products and enhancing selectivity to the polyglyceryl ether derivative, the reaction system is preferably pressurized by introducing the inert gas thereinto such that a partial pressure of glycidol in the reaction system is adjusted to from 0.10 to 0.49 MPa, preferably from 0.10 to 0.36 MPa and more preferably from 0.10 to 0.25 MPa. From the viewpoint of shortening the reaction time under the applied pressures, the reaction temperature is preferably controlled to from 100 to 250° C., more preferably from 180 to 250° C. and still more preferably from 210 to 250° C.

The volume of a vapor phase in the reaction system during or after the reaction is preferably 50% or less, more preferably 30% or less and still more preferably from 1 to 30% on the basis of a volume of a reactor used from the viewpoint of fully suppressing polymerization between molecules of glycidol.

Further, the concentration of glycidol in the vapor phase of the reaction system is preferably 70% or less, more preferably 50% or less and still more preferably from 1 to 30% from the viewpoint of fully suppressing polymerization between molecules of glycidol.

In addition, the reaction conducted under a solvent-free condition is excellent from the viewpoint of a good industrial convenience. However, when the reaction system is in a highly viscous state or a non-uniform state owing to composition of the alcohol or amount of glycidol added, the reaction may be conducted in the presence of an adequate amount of a suitable solvent.

Examples of the solvent include amphipatic solvents such as tetrahydrofuran, dioxane and ethylene glycol dimethyl ether; hydrocarbon-based solvents, e.g., aliphatic hydrocarbons such as hexane, heptane, cyclohexane, methyl cyclohexane, isooctane and hydrogenated triisobutylene, and aromatic hydrocarbons such as benzene, toluene, xylene and ethyl benzene; silicone-based solvents such as octamethyl cyclotetrasiloxane and decamethyl cyclopentasiloxane; and combination of these solvents.

These solvents may be used alone or in combination of any two or more thereof.

Meanwhile, these solvents are preferably subjected to dehydration or deaeration upon use.

After completion of the reaction, the aluminosilicate used therein is removed from the resulting reaction solution. In the present invention, the aluminosilicate may be readily removed from the reaction solution by a suitable method such as filtration and decantation. The thus obtained reaction solution may be subjected to washing treatment, if required, thereby obtaining the polyglyceryl ether derivative as aimed. If required, the resultant polyglyceryl ether derivative may be further purified by an ordinary method such as silica gel column chromatography, distillation and recrystallization. At this time, the used aluminosilicate may be recovered and reused.

In addition, after completion of the reaction, when polyglycerol is produced in an amount exceeding its solubility in the liquid reaction mixture and therefore precipitated therein, the polyglycerol may be readily removed therefrom by subjecting the liquid reaction mixture to filtration, etc., according to requirements.

The polyglyceryl ether derivative obtained by the process of the present invention is useful as a nonionic surfactant, although the applications of the polyglyceryl ether derivative and the configuration thereof upon use are not particularly limited. For example, the polyglyceryl ether derivative may be used in the form of a compound per se, an aqueous solution, a water dispersion or an emulsion containing the other oil phase, a hydrous gel, an alcohol solution or dispersion, an oily gel, and a mixture or an impregnated or penetrated product with a solid substance such as waxes.

EXAMPLES

In the following Examples and Comparative Examples, the terms "%" and "ppm" represent "% by mass" and "ppm by mass", respectively, unless otherwise specified.

In the following Preparation Examples of the ion-exchanged aluminosilicates, the (cations/Al) molar ratio and the (Al/Si) molar ratio were calculated from the results of elemental quantitative analysis using ICP-AES, whereas the average particle size was determined as a volume-median diameter calculated from the values obtained by measurement of a laser diffraction/scattering particle size distribution of the aluminosilicate.

In the following Examples and Comparative Examples, the conversion rates of the raw alcohol and glycidol after completion of the reaction were analyzed using a gas chromatography, whereas the polyglycerol contained in the liquid reaction mixture was analyzed using a liquid chromatography. The analyzers and analytic conditions used in the present invention are shown below.

<ICP-AES>

Apparatus: "Optima 5300DV" available from PerkinElmer Co., Ltd.

<Measurement of Average Particle Size of Aluminosilicate>

Laser diffraction/scattering particle size distribution analyzer: "LA-920" available from Horiba Ltd.; Dispersing medium: water; Pretreatment; ultrasonic treatment for 1 min; Measuring temperature: 25° C.; Refractive index used for calculation: 1.2

<Analysis by Gas Chromatography>

Apparatus: "HP 6850 Series" available from Hewlett Packard Co.

Column: "B-1HT" available from J & W Corp., (inner diameter: 0.25 mm; length: 15 m; membrane thickness: 0.1 μm)

Carrier gas: He; 1.0 mL/min

Injection: 300° C.; split ratio: 1/50
Detection: FID method; 300° C.
Column temperature condition: held at 40° C. for 2 min→raised at 10° C./min→held at 350° C. for 2 min
<Analysis by Liquid Chromatography>
Apparatus: "LaChrom" available from Hitachi Ltd.
Column: "Amide-80" (Catalogue No. 13071) available from Tosoh Corp.
Column size: 4.6 mm (ID)×25.0 cm (L)
Eluent: acetonitrile/water=1:1; flow rate: 1.0 mL/min
Detection: RI (refractive index);
Column temperature: 40° C.
<Preparation of Ion-Exchanged Aluminosilicate>

Preparation Example 1

Preparation of Py-Y-Type Zeolite 400

A 300 mL round-bottom flask was charged with 12.5 g of zeolite ("HSZ-390HUA" available from Tosoh Corp.; Al/Si molar ratio: 0.0027), 125 mL of toluene and 2.02 g of pyridine to prepare a zeolite-dispersed slurry. The resulting slurry was stirred in an oil bath at 120° C. under reflux for 13 h, and then subjected to filtration to separate the zeolite therefrom. The thus separated zeolite was washed with 500 mL of dichloromethane and then dried at 180° C. under a pressure of 40.0 Pa for 6 h. As a result of analysis by ICP-AES, it was confirmed that the resulting Py-Y-type zeolite had a composition (by weight) of Si: 47%, Al: 0.12% and nitrogen: 0.02%, and the (Al/Si) molar ratio thereof was 0.0027, the (cations/Al) molar ratio thereof was 0.96, and the average particle size (median diameter) thereof was 4.4 µm.

Preparation Example 2

Preparation of Na—Y-Type Zeolite 400

A 1000 mL four-necked round-bottom flask was charged with 52.5 g of zeolite ("HSZ-390HUA" available from Tosoh Corp.; Al/Si molar ratio: 0.0027), 500 mL of ion-exchanged water and 50.1 g of sodium nitrate to prepare a zeolite-dispersed slurry. The resulting slurry was stirred while heating in an oil bath at 100° C. over a whole day and night. The slurry was allowed to stand and then subjected to decantation to separate a supernatant liquid therefrom, and further a fresh sodium nitrate aqueous solution (prepared from 50.27 g of sodium nitrate and 400 mL of ion-exchanged water) was added thereto. The resulting mixture was stirred while heating in an oil bath at 100° C. over a whole day and night. This procedure was repeated one more time. After completion of the treatment, the obtained mixture was subjected to filtration to separate the zeolite therefrom. The thus separated zeolite was washed with 1500 mL of ion-exchanged water and then dried at 180° C. under a pressure of 40.0 Pa for 10 h. As a result of analysis by ICP-AES, it was confirmed that the resulting Na—Y-type zeolite had a composition (by weight) of Si: 46%, Al: 0.11% and sodium (Na): 0.03%, and the (Al/Si) molar ratio thereof was 0.0025, the (cations/Al) molar ratio thereof was 0.32, and the average particle size (median diameter) thereof was 6.5 µm.

Preparation Example 3

Preparation of Na-Mordenite 240

A 1000 mL four-necked round-bottom flask was charged with 50.65 g of zeolite ("HSZ-690HOA" available from Tosoh Corp.; Al/Si molar ratio: 0.0077), 500 mL of ion-exchanged water and 55.13 g of sodium nitrate to prepare a zeolite-dispersed slurry. The resulting slurry was stirred while heating in an oil bath at 100° C. over a whole day and night. Then, the slurry was subjected to filtration to separate Na-mordenite therefrom. The thus separated Na-mordenite was washed with 1500 mL of ion-exchanged water and then dried at 180° C. under a pressure of 40.0 Pa for 10 h. As a result of analysis by ICP-AES, it was confirmed that the resulting Na-mordenite had a composition (by weight) of Si: 46%, Al: 0.33% and Na: 0.62%, and the (Al/Si) molar ratio thereof was 0.0075, the (cations/Al) molar ratio thereof was 2.20, and the average particle size (median diameter) thereof was 11.4 µm.

Preparation Example 4

Preparation of Na-β-Zeolite

A 1000 mL four-necked round-bottom flask was charged with 51.19 g of zeolite ("HSZ-980HOA" available from Tosoh Corp.; Al/Si molar ratio: 0.0051), 500 mL of ion-exchanged water and 52.89 g of sodium nitrate to prepare a zeolite-dispersed slurry. The resulting slurry was stirred while heating in an oil bath at 100° C. over a whole day and night. Then, the slurry was subjected to filtration to separate the zeolite therefrom. The thus separated zeolite was washed with 1500 mL of ion-exchanged water and then dried at 180° C. under a pressure of 40.0 Pa for 8 h. As a result of analysis by ICP-AES, it was confirmed that the resulting Na-β-zeolite had a composition (by weight) of Si: 45%, Al: 0.23% and Na: 0.23%, and the (Al/Si) molar ratio thereof was 0.0053, the (cations/Al) molar ratio thereof was 1.17, and the average particle size (median diameter) thereof was 1.7 µm.

Preparation Example 5

Preparation of Na—Y-type Zeolite 100

A 1000 mL four-necked round-bottom flask was charged with 51.53 g of zeolite ("HSZ-385HUA" available from Tosoh Corp.; Al/Si molar ratio: 0.021), 500 mL of ion-exchanged water and 103.54 g of sodium nitrate to prepare a zeolite-dispersed slurry. The resulting slurry was stirred while heating in an oil bath at 100° C. over a whole day and night. The slurry was allowed to stand and then subjected to decantation to separate a supernatant liquid therefrom, and further a fresh sodium nitrate aqueous solution (prepared from 103.09 g of sodium nitrate and 300 mL of ion-exchanged water) was added thereto. The resulting mixture was stirred while heating in an oil bath at 100° C. over a whole day and night. This procedure was repeated one more time. After completion of the treatment, the obtained mixture was subjected to filtration to separate the zeolite therefrom. The thus separated zeolite was washed with 1500 mL of ion-exchanged water and then dried at 180° C. under a pressure of 40.0 Pa for 8 h. As a result of analysis by ICP-AES, it was confirmed that the resulting Na—Y-type zeolite had a composition (by weight) of Si: 45%, Al: 0.73% and Na: 0.43%, and the (Al/Si) molar ratio thereof was 0.017, the (cations/Al) molar ratio thereof was 0.69, and the average particle size (median diameter) thereof was 1.9 µm.

Preparation Example 6

Preparation of Mg—Y-type Zeolite 400

A 500 mL four-necked round-bottom flask was charged with 12.20 g of the above prepared Na—Y-type zeolite, 150 mL of ion-exchanged water and 31.60 g of magnesium nitrate hexahydrate to prepare a zeolite-dispersed slurry. The resulting slurry was stirred while heating in an oil bath at 100° C. over a whole day and night. The slurry was allowed to stand and then subjected to decantation to separate a supernatant liquid therefrom, and further a fresh magnesium nitrate aqueous solution (prepared from 30.05 g of magnesium nitrate hexahydrate and 100 mL of ion-exchanged water) was added thereto. The resulting mixture was stirred while heating in an oil bath at 100° C. over a whole day and night. This procedure was repeated one more time. After completion of the treatment, the obtained mixture was subjected to filtration to separate the zeolite therefrom. The thus separated zeolite was washed with 1500 mL of ion-exchanged water and then dried at 180° C. under a pressure of 40.0 Pa for 8 h. As a result of analysis by ICP-AES, it was confirmed that the resulting Mg—Y-type zeolite had a composition (by weight) of Si: 43%, Al: 0.12% and magnesium (Mg): 0.02%, and the (Al/Si) molar ratio thereof was 0.0029, the (cations/Al) molar ratio thereof was 0.18, and the average particle size (median diameter) thereof was 6.2 μm.

Preparation Example 7

Preparation of Cs—Y-type Zeolite 400

A 500 mL four-necked round-bottom flask was charged with 20.63 g of zeolite ("HSZ-390HUA" available from Tosoh Corp.; Al/Si molar ratio: 0.0027), 150 mL of ion-exchanged water and 5.24 g of cesium nitrate to prepare a zeolite-dispersed slurry. The resulting slurry was stirred while heating in an oil bath at 100° C. over a whole day and night. The slurry was allowed to stand and then subjected to decantation to separate a supernatant liquid therefrom, and further a fresh cesium nitrate aqueous solution (prepared from 5.04 g of cesium nitrate and 70 mL of ion-exchanged water) was added thereto. The resulting mixture was stirred while heating in an oil bath at 100° C. over a whole day and night. This procedure was repeated one more time. After completion of the treatment, the obtained mixture was subjected to filtration to separate the zeolite therefrom. The thus separated zeolite was washed with 1500 mL of ion-exchanged water and then dried at 180° C. under a pressure of 40.0 Pa for 8 h. As a result of analysis by ICP-AES, it was confirmed that the resulting Cs—Y-type zeolite had a composition (by weight) of Si: 44%, Al: 0.12% and cesium (Cs): 0.13%, and the (Al/Si) molar ratio thereof was 0.0028, the (cations/Al) molar ratio thereof was 0.22, and the average particle size (median diameter) thereof was 6.0 μm.

Example 1

A 200 mL four-necked round-bottom flask was charged with 50.01 g (0.27 mol) of lauryl alcohol and 2.51 g of the Py-Y-type zeolite 400 obtained in Preparation Example 1, and the contents of the flask were heated to 200° C. while stirring under a nitrogen flow. Next, while maintaining the temperature of 200° C., 10.22 g (0.14 mol) of glycidol were dropped into the flask over 3 h, and the contents of the flask were continuously stirred as such for 4 h. Thereafter, 10.77 g (0.15 mol) of glycidol were dropped into the flask over 3 h, and the contents of the flask were continuously stirred as such for 4 h. Then, 8.73 g (0.12 mol) of glycidol were further dropped into the flask over 3 h, and the contents of the flask were continuously stirred as such for 4 h, thereby obtaining 80.60 g of a final reaction product. The reaction mixture was subjected to filtration to remove the zeolite therefrom. As a result of analyzing the thus obtained reaction product by gas chromatography, it was confirmed that lauryl polyglyceryl ether was produced (conversion rate of glycidol: 99% or more). In addition, it was confirmed that the conversion rate of lauryl alcohol was 73.7%, the content of polyglycerol in the reaction product was 2.5% by mass, and the polyglyceryl moiety of the resulting lauryl polyglyceryl ether had a mass-average polymerization degree of 1.36.

Example 2

A 200 mL four-necked round-bottom flask was charged with 50.00 g (0.27 mol) of lauryl alcohol and 2.50 g of the Na—Y-type zeolite 400 obtained in Preparation Example 2, and the contents of the flask were heated to 200° C. while stirring under a nitrogen flow. Next, while maintaining the temperature of 200° C., 9.89 g (0.13 mol) of glycidol were dropped into the flask over 3 h, and the contents of the flask were continuously stirred as such for 4 h. Thereafter, 9.77 g (0.13 mol) of glycidol were dropped into the flask over 3 h, and the contents of the flask were continuously stirred as such for 4 h. Then, 10.09 g (0.14 mol) of glycidol were further dropped into the flask over 3 h, and the contents of the flask were continuously stirred as such for 4 h, thereby obtaining 80.33 g of a final reaction product. The reaction mixture was subjected to filtration to remove the zeolite therefrom. As a result of analyzing the thus obtained reaction product by gas chromatography, it was confirmed that lauryl polyglyceryl ether was produced (conversion rate of glycidol: 99% or more). In addition, it was confirmed that the conversion rate of lauryl alcohol was 73.5%, the content of polyglycerol in the reaction product was 2.5% by mass, and the polyglyceryl moiety of the resulting lauryl polyglyceryl ether had a mass-average polymerization degree of 1.35.

Example 3

A 200 mL four-necked round-bottom flask was charged with 50.02 g (0.27 mol) of lauryl alcohol and Na—Y-type zeolite ("HSZ-320NAA" available from Tosoh Corp.; Al/Si molar ratio: 0.35; cations/Al molar ratio: 1.00), and the contents of the flask were heated to 200° C. while stirring under a nitrogen flow. Next, while maintaining the temperature of 200° C., 10.21 g (0.14 mol) of glycidol were dropped into the flask over 3 h, and the contents of the flask were continuously stirred as such for 4 h. Thereafter, 9.53 g (0.13 mol) of glycidol were dropped into the flask over 3 h, and the contents of the flask were continuously stirred as such for 4 h. Then, 10.05 g (0.14 mol) of glycidol were further dropped into the flask over 3 h, and the contents of the flask were continuously stirred as such for 4 h, thereby obtaining 80.15 g of a final reaction product. The reaction mixture was subjected to filtration to remove the zeolite therefrom. As a result of analyzing the thus obtained reaction product by gas chromatography, it was confirmed that lauryl polyglyceryl ether was produced (conversion rate of glycidol; 99% or more). In addition, it was confirmed that the conversion rate of lauryl alcohol was 62.2%, the content of polyglycerol in the reaction product was 10% by mass, and the polyglyceryl moiety of the resulting lauryl polyglyceryl ether had a mass-average polymerization degree of 1.10.

Example 4

A 200 mL four-necked round-bottom flask was charged with 50.00 g (0.27 mol) of lauryl alcohol and 2.50 g of the Na-mordenite 240 obtained in Preparation Example 3, and the contents of the flask were heated to 200° C. while stirring under a nitrogen flow. Next, while maintaining the temperature of 200° C., 10.14 g (0.14 mol) of glycidol were dropped into the flask over 3 h, and the contents of the flask were continuously stirred as such for 4 h. Thereafter, 9.93 g (0.13 mol) of glycidol were dropped into the flask over 3 h, and the contents of the flask were continuously stirred as such for 4 h. Then, 9.79 g (0.13 mol) of glycidol were further dropped into the flask over 3 h, and the contents of the flask were continuously stirred as such for 4 h, thereby obtaining 77.38 g of a final reaction product. The reaction mixture was subjected to filtration to remove the zeolite therefrom. As a result of analyzing the thus obtained reaction product by gas chromatography, it was confirmed that lauryl polyglyceryl ether was produced (conversion rate of glycidol: 99% or more). In addition, it was confirmed that the conversion rate of lauryl alcohol was 75.6%, the content of polyglycerol in the reaction product was 2.3% by mass, and the polyglyceryl moiety of the resulting lauryl polyglyceryl ether had a mass-average polymerization degree of 1.37.

Example 5

A 200 mL four-necked round-bottom flask was charged with 50.00 g (0.27 mol) of lauryl alcohol and 2.50 g of the Na-β-zeolite obtained in Preparation Example 4, and the contents of the flask were heated to 200° C. while stirring under a nitrogen flow. Next, while maintaining the temperature of 200° C., 10.41 g (0.14 mol) of glycidol were dropped into the flask over 3 h, and the contents of the flask were continuously stirred as such for 4 h. Thereafter, 9.58 g (0.13 mol) of glycidol were dropped into the flask over 3 h, and the contents of the flask were continuously stirred as such for 4 h. Then, 9.99 g (0.13 mol) of glycidol were further dropped into the flask over 3 h, and the contents of the flask were continuously stirred as such for 4 h, thereby obtaining 77.00 g of a final reaction product. The reaction mixture was subjected to filtration to remove the zeolite therefrom. As a result of analyzing the thus obtained reaction product by gas chromatography, it was confirmed that lauryl polyglyceryl ether was produced (conversion rate of glycidol: 99% or more). In addition, it was confirmed that the conversion rate of lauryl alcohol was 66.6%, the content of polyglycerol in the reaction product was 9.2% by mass, and the polyglyceryl moiety of the resulting lauryl polyglyceryl ether had a mass-average polymerization degree of 1.13.

Example 6

A 200 mL four-necked round-bottom flask was charged with 50.00 g (0.27 mol) of lauryl alcohol and 2.50 g of the Na—Y-type zeolite 100 obtained in Preparation Example 5, and the contents of the flask were heated to 200° C. while stirring under a nitrogen flow. Next, while maintaining the temperature of 200° C., 9.94 g (0.13 mol) of glycidol were dropped into the flask over 3 h, and the contents of the flask were continuously stirred as such for 4 h. Thereafter, 9.80 g (0.13 mol) of glycidol were dropped into the flask over 3 h, and the contents of the flask were continuously stirred as such for 4 h. Then, 9.98 g (0.14 mol) of glycidol were further dropped into the flask over 3 h, and the contents of the flask were continuously stirred as such for 4 h, thereby obtaining 76.60 g of a final reaction product. The reaction mixture was subjected to filtration to remove the zeolite therefrom. As a result of analyzing the thus obtained reaction product by gas chromatography, it was confirmed that lauryl polyglyceryl ether was produced (conversion rate of glycidol: 99% or more). In addition, it was confirmed that the conversion rate of lauryl alcohol was 53.2%, the content of polyglycerol in the reaction product was 20.0% by mass, and the polyglyceryl moiety of the resulting lauryl polyglyceryl ether had a mass-average polymerization degree of 0.87.

Example 7

A 200 mL four-necked round-bottom flask was charged with 50.00 g (0.27 mol) of lauryl alcohol and 2.50 g of the Mg—Y-type zeolite 400 obtained in Preparation Example 6, and the contents of the flask were heated to 200° C. while stirring under a nitrogen flow. Next, while maintaining the temperature of 200° C., 9.78 g (0.13 mol) of glycidol were dropped into the flask over 3 h, and the contents of the flask were continuously stirred as such for 4 h. Thereafter, 9.89 g (0.13 mol) of glycidol were dropped into the flask over 3 h, and the contents of the flask were continuously stirred as such for 4 h. Then, 10.33 g (0.14 mol) of glycidol were further dropped into the flask over 3 h, and the contents of the flask were continuously stirred as such for 4 h, thereby obtaining 78.32 g of a final reaction product. The reaction mixture was subjected to filtration to remove the zeolite therefrom. As a result of analyzing the thus obtained reaction product by gas chromatography, it was confirmed that lauryl polyglyceryl ether was produced (conversion rate of glycidol: 99% or more). In addition, it was confirmed that the conversion rate of lauryl alcohol was 54.2%, the content of polyglycerol in the reaction product was 16.0% by mass, and the polyglyceryl moiety of the resulting lauryl polyglyceryl ether had a mass-average polymerization degree of 0.71.

Example 8

A 200 mL four-necked round-bottom flask was charged with 50.00 g (0.27 mol) of lauryl alcohol and 2.50 g of the Cs—Y-type zeolite 400 obtained in Preparation Example 7, and the contents of the flask were heated to 200° C. while stirring under a nitrogen flow. Next, while maintaining the temperature of 200° C., 9.92 g (0.13 mol) of glycidol were dropped into the flask over 3 h, and the contents of the flask were continuously stirred as such for 4 h. Thereafter, 10.11 g (0.14 mol) of glycidol were dropped into the flask over 3 h, and the contents of the flask were continuously stirred as such for 4 h. Then, 10.12 g (0.14 mol) of glycidol were further dropped into the flask over 3 h, and the contents of the flask were continuously stirred as such for 4 h, thereby obtaining 81.02 g of a final reaction product. The reaction mixture was subjected to filtration to remove the zeolite therefrom. As a result of analyzing the thus obtained reaction product by gas chromatography, it was confirmed that lauryl polyglyceryl ether was produced (conversion rate of glycidol: 99% or more). In addition, it was confirmed that the conversion rate of lauryl alcohol was 76.5%, the content of polyglycerol in the reaction product was 3.0% by mass, and the polyglyceryl moiety of the resulting lauryl polyglyceryl ether had a mass-average polymerization degree of 1.40.

Comparative Example 1

A 200 mL four-necked round-bottom flask was charged with 50.00 g (0.27 mol) of lauryl alcohol, and the lauryl alcohol in the flask was heated to 200° C. while stirring under a nitrogen flow. Next, while maintaining the temperature of 200° C., 9.83 g (0.13 mol) of glycidol were dropped into the flask over 3 h, and the contents of the flask were continuously stirred as such for 4 h. Thereafter, 10.02 g (0.14 mol) of glycidol were dropped into the flask over 3 h, and the contents of the flask were continuously stirred as such for 4 h. Then, 9.96 g (0.13 mol) of glycidol were further dropped into the flask over 3 h, and the contents of the flask were continuously stirred as such for 4 h, thereby obtaining 78.63 g of a final reaction product. Thereafter, the resulting reaction mixture was subjected to filtration to remove polyglycerol precipitated therefrom. As a result of analyzing the thus obtained reaction product by gas chromatography, it was confirmed that lauryl polyglyceryl ether was produced (conversion rate of glycidol: 99.9% or more). In addition, it was confirmed that the conversion rate of lauryl alcohol was 46.3%, the content of polyglycerol in the reaction product was 27.0% by mass, and the polyglyceryl moiety of the resulting lauryl polyglyceryl ether had a mass-average polymerization degree of 0.44.

Comparative Example 2

A 200 mL four-necked round-bottom flask was charged with 30.08 g (0.16 mol) of lauryl alcohol and 1.50 g of ion-unexchanged H—Y-type zeolite ("HSZ-390HUA" available from Tosoh Corp.; composition (by weight): Si: 46%, Al: 0.12%, sodium; not detected, and nitrogen: not detected; Al/Si molar ratio: 0.0027), and the contents of the flask was heated to 150° C. while stirring under a nitrogen flow (this was because when heated to 200° C., the resulting reaction liquid was hardly stirred owing to rapid production of polymers derived from the glycidol). Next, while maintaining the temperature of 150° C., 18.39 g (0.25 mol) of glycidol were dropped into the flask over 3 h. After completion of the dropping, the resulting reaction liquid was kept in a viscous slurry state and therefore hardly stirred. For this reason, the stirring of the reaction liquid was interrupted, and the reaction liquid was subjected to filtration to separate a final reaction product therefrom. As a result of analyzing the thus obtained final reaction product solution by gas chromatography, it was confirmed that lauryl polyglyceryl ether was produced (conversion rate of glycidol: 94.0%). In addition, it was confirmed that the conversion rate of lauryl alcohol was 5.4%, and the content of solid components therein inclusive of the zeolite recovered was 32% by mass on the basis of the whole materials charged.

Comparative Example 3

A 200 mL four-necked round-bottom flask was charged with 50.00 g (0.27 mol) of lauryl alcohol and 2.51 g of activated carbon ("Shirasagi A" (tradename) available from Japan Enviro Chemicals, Ltd.), and the contents of the flask was heated to 200° C. while stirring under a nitrogen flow. Next, while maintaining the temperature of 200° C., 10.24 g (0.14 mol) of glycidol were dropped into the flask over 3 h, and the contents of the flask were continuously stirred as such for 4 h. Thereafter, 9.91 g (0.13 mol) of glycidol were dropped into the flask over 3 h, and the contents of the flask were continuously stirred as such for 4 h. Then, 9.90 g (0.13 mol) of glycidol were further dropped into the flask over 3 h, and the contents of the flask were continuously stirred as such for 4 h, thereby obtaining 77.99 g of a final reaction product. Thereafter, the resulting reaction mixture was subjected to filtration to remove the zeolite therefrom. As a result of analyzing the thus obtained reaction product by gas chromatography, it was confirmed that lauryl polyglyceryl ether was produced (conversion rate of glycidol: 99% or more). In addition, it was confirmed that the conversion rate of lauryl alcohol was 39.6%, the content of polyglycerol in the reaction product was 21.7% by mass, and the polyglyceryl moiety of the resulting lauryl polyglyceryl ether had a mass-average polymerization degree of 0.64.

TABLE 1

| | Zeolite | | | | Reaction conditions | Conversion rate of lauryl alcohol (%) | By-products (mass %) |
| --- | --- | --- | --- | --- | --- | --- | --- |
| | Type | Al/Si (mol/mol) | Cations | Cations/Al (mol/mol) | | | |
| Example 1 | Y | 0.0027 | PyH$^+$ | 0.96 | A | 73.7 | 2.5 |
| Example 2 | Y | 0.0025 | Na$^+$ | 0.32 | A | 73.5 | 2.5 |
| Example 3 | Y | 0.35 | Na$^+$ | 1.0 | A | 62.2 | 10 |
| Example 4 | Mordenite | 0.0075 | Na$^+$ | 2.2 | A | 75.6 | 2.3 |
| Example 5 | β | 0.0053 | Na$^+$ | 1.2 | A | 66.6 | 9.2 |
| Example 6 | Y | 0.017 | Na$^+$ | 0.69 | A | 53.2 | 20 |
| Example 7 | Y | 0.0029 | Mg$^{2+}$ | 0.18 | A | 54.2 | 16 |
| Example 8 | Y | 0.0028 | Cs$^+$ | 0.22 | A | 76.5 | 3.0 |
| Comparative Example 1 | | | Not used | | A | 46.3 | 27 |
| Comparative Example 2 | Y | 0.0027 | Not exchanged with cations | Not detected | B | 5.4 | 30 |
| Comparative Example 3 | | Activated carbon was used instead | | | A | 39.6 | 22 |

Details of the reaction conditions A and B appearing in Table 1 are as follows.

(Reaction Conditions A)
    Charge ratio: Lauryl alcohol: glycidol=1:1.5 (molar ratio); zeolite (activated carbon was used instead in Comparative Example 3): 5% by mass (based on lauryl alcohol)
    Reaction temperature: 200° C.
    Glycidol adding condition: After dropping 0.5 equivalent of glycidol (based on lauryl alcohol) over 3 h, the obtained mixture was stirred for 4 h, and this procedure was repeated three times.

(Reaction Conditions B)
    Charge ratio: Lauryl alcohol: glycidol=1:1.5 (molar ratio); zeolite: 5% by mass (based on lauryl alcohol)
    Reaction temperature: 150° C.
    Glycidol adding condition: Glycidol was dropped in an amount of 1.5 equivalent (based on lauryl alcohol) over 3 h.

From the results shown in Table 1, it was recognized that in the process of the present invention, even when the conversion rate of the alcohol was increased, it was possible to suppress production of polyglycerol as a by-product.

Example 9

A 500 mL autoclave was charged with 150.0 g (0.80 mol) of lauryl alcohol, 7.51 g (5% by mass based on lauryl alcohol) of the Na—Y-type zeolite 400 obtained in Preparation Example 2 as a catalyst, and 29.8 g (0.40 mol; 0.5 equivalent based on lauryl alcohol) of glycidol, and an inside pressure of the autoclave was increased to 0.3 MPa (gauge pressure) (raised up to 0.6 MPa (gauge pressure) after heating) by introducing nitrogen thereinto, and further the contents of the autoclave were heated to 230° C. while stirring (in which the temperature began to raise up from 25° C. at a temperature rise rate of 6.8° C./min; glycidol partial pressure: 0.25 MPa). The contents of the autoclave were reacted with each other for 4 h from the time (0 hour) at which the temperature reached 230° C., thereby obtaining 187.2 g of a final reaction product. The obtained reaction mixture was subjected to filtration to remove the catalyst therefrom. As result of analyzing the thus obtained reaction product by gas chromatography, it was confirmed that lauryl polyglyceryl ether was produced (conversion rate of glycidol: 99% or more). The results are shown in Table 2.

Example 10

In the same manner as in Example 9, the contents of the autoclave were heated to 230° C. (in which the temperature began to raise up from 25° C. at a temperature rise rate of 6.8° C./min; glycidol partial pressure: 0.25 MPa), and then reacted with each other for 4 h from the time (0 hour) at which the temperature reached 230° C. Thereafter, 29.8 g (0.40 mol; 0.5 equivalent based on lauryl alcohol) of glycidol were further added to the autoclave, and the contents of the autoclave were reacted with each other for 4 h, thereby obtaining 217.1 g of a final reaction product. As result of analyzing the thus obtained reaction product by gas chromatography, it was confirmed that lauryl polyglyceryl ether was produced (conversion rate of glycidol: 99% or more). The results are shown in Table 2.

Example 11

In the same manner as in Example 9, the contents of the autoclave were heated to 230° C. (in which the temperature began to raise up from 25° C. at a temperature rise rate of 6.8° C./min; glycidol partial pressure: 0.25 MPa), and then reacted with each other for 4 h from the time (0 hour) at which the temperature reached 230° C. Thereafter, 29.8 g (0.40 mol; 0.5 equivalent based on lauryl alcohol) of glycidol were further added to the autoclave, and the contents of the autoclave were reacted with each other for 4 h. Then, 29.8 g (0.40 mol; 0.5 equivalent based on lauryl alcohol) of glycidol were further added to the autoclave, and the contents of the autoclave were reacted with each other for 4 h, thereby obtaining 246.9 g of a final reaction product. As result of analyzing the thus obtained reaction product by gas chromatography, it was confirmed that lauryl polyglyceryl ether was produced (conversion rate of glycidol: 99% or more). The results are shown in Table 2.

Example 12

In the same manner as in Example 9 except that glycidol was charged in an amount of 89.54 g (1.21 mol; 1.5 equivalents based on lauryl alcohol), the contents of the autoclave were heated to 230° C. (in which the temperature began to raise up from 25° C. at a temperature rise rate of 6.8° C./min; glycidol partial pressure; 0.36 MPa), and then reacted with each other for 4 h from the time (0 hour) at which the temperature reached 230° C., thereby obtaining 215.8 g of a final reaction product. As result of analyzing the thus obtained reaction product by gas chromatography, it was confirmed that lauryl polyglyceryl ether was produced (conversion rate of glycidol: 99% or more). The results are shown in Table 2.

Example 13

In the same manner as in Example 9 except that glycidol was charged in an amount of 89.60 g (1.21 mol; 1.5 equivalents based on lauryl alcohol), the contents of the autoclave were heated to 250° C. (in which the temperature began to raise up from 25° C. at a temperature rise rate of 7.5° C./min; glycidol partial pressure; 0.48 MPa), and then reacted with each other for 3 h from the time (0 hour) at which the temperature reached 250° C., thereby obtaining 232.2 g of a final reaction product. As result of analyzing the thus obtained reaction product by gas chromatography, it was confirmed that lauryl polyglyceryl ether was produced (conversion rate of glycidol: 99% or more). The results are shown in Table 2.

TABLE 2

| | | Example 9 | Example 10 | Example 11 | Example 12 | Example 13 |
|---|---|---|---|---|---|---|
| Glycidol | Amount added [equivalent/lauryl alcohol] | 0.5 | 1.0 | 1.5 | 1.5 | 1.5 |
| | Addition method | Added at one time | Added intermittently in two divided parts | Added intermittently in three divided parts | Added at one time | Added at one time |
| Reaction conditions | Reaction temperature [° C.] | 230 | 230 | 230 | 230 | 250 |
| | Reaction time [h] | 4 | 8 | 12 | 4 | 3 |
| | Gauge pressure [MPa] | 0.6 | 0.6 | 0.6 | 0.6 | 0.6 |
| | Concentration of glycidol in vapor phase [volume %] | 41.6 | 41.2 | 41.4 | 65.7 | 63.8 |
| Conversion rate of lauryl alcohol [%] | | 34.2 | 56.5 | 70.2 | 66.0 | 65.5 |
| Content of polyglycerol [mass %] | | 1.4 | 2.9 | 4.6 | 7.5 | 7.7 |

TABLE 2-continued

| | Example 9 | Example 10 | Example 11 | Example 12 | Example 13 |
|---|---|---|---|---|---|
| Content of glyceryl ether [mass %] | 40.6 | 62.4 | 74.6 | 68.1 | 65.6 |
| Presence or non-presence of deposits | None | None | None | None | None |

Meanwhile, the "Concentration of glycidol in vapor phase (volume %)" appearing in Table 2 was calculated from the following formula:

Concentration of glycidol in vapor phase (volume %)= (volume of glycidol in vapor phase)/[(volume of inert gas in vapor phase)+(volume of glycidol in vapor phase)]

In the above formula, the "volume of inert gas in vapor phase" and "volume of glycidol in vapor phase" are respectively determined from the amounts of the respective gases charged according to the known vapor-liquid equilibrium calculation.

From the results shown in Table 2, it was recognized that when the reaction was carried out, in particular, under applied pressure conditions, production of polyglycerol could be suppressed even on a high-temperature side where the amount of polyglycerol produced tends to be increased, so that it was possible to produce the aimed polyglyceryl ether in a more efficient manner.

Industrial Applicability

In the process for producing the polyglyceryl ether derivatives according to the present invention, it is possible to realize a highly-selective addition reaction of an alcohol and glycidol, and suppress production of polyglycerol as a by-product even when a conversion rate of the alcohol is increased. In addition, in the process of the present invention, the catalyst removal step can be simplified, resulting in economical and industrially advantageous process.

Further, the obtained polyglyceryl ether derivatives are useful as a nonionic surfactant and therefore can be extensively used in various industrial applications such as food, cosmetics, perfumes, agricultural chemicals and drugs, for example, for the purposes of emulsification, solubilization, dispersion, cleaning, foaming, defoaming, penetration, antibacterial effect, etc.

The invention claimed is:

1. A process for producing a polyglyceryl ether compound, comprising reacting an alcohol other than glycidol and glycerol with glycidol in the presence of an aluminosilicate, wherein the hydrogen ions thereof are partially or wholly ion-exchanged with at least one cation selected from the group consisting of a pyridinium ion, a sodium ion a potassium ion, and a cesium ion, and wherein a molar ratio of an aluminum atom (Al) to a silicon atom (Si) (Al/Si) in the aluminosilicate is more than 0 and 0.01 or less.

2. The process for producing a polyglyceryl ether compound according to claim 1, wherein the aluminosilicate is zeolite.

3. The process for producing a polyglyceryl ether compound according to claim 2, wherein the zeolite is at least one zeolite selected from the group consisting of a zeolite-Y, a zeolite-β, a mordenite zeolite and ZSM-5.

4. The process for producing a polyglyceryl ether compound according to claim 1, wherein the aluminosilicate has an average particle size (median diameter) of from 0.5 to 100 μm.

5. The process for producing a polyglyceryl ether compound according to claim 1, wherein the alcohol other than glycidol and glycerol is a compound represented by formula (1):

$$R^1\text{—}(OA^1)_n\text{—}(OA^2)_m\text{—}OH \qquad (1)$$

wherein $R^1$ is a hydrocarbon group having 1 to 36 carbon atoms; $A^1$ is a linear or branched alkanediyl group having 2 to 4 carbon atoms; $A^2$ is a hydroxyl group-containing linear or branched alkanediyl group having 2 to 4 carbon atoms; and n and m represent mass-average polymerization degrees of the $OA^1$ group and the $OA^2$ group, respectively, in which n is a number of from 0 to 20 and m is a number of from 0 to 2.

6. The process for producing a polyglyceryl ether compound according to claim 1, wherein the alcohol other than glycidol and glycerol is an aliphatic alcohol having 8 to 18 carbon atoms.

7. The process for producing a polyglyceryl ether compound according to claim 1, wherein a gauge pressure in the reaction system is from 0.1 to 10 MPa.

8. The process for producing a polyglyceryl ether compound according to claim 1, wherein the alcohol other than glycidol and glycerol comprises at least one of
(i) an aliphatic alcohol selected from the group consisting of methyl alcohol, ethyl alcohol, propyl alcohol, isopropyl alcohol, pentyl alcohol, isopentyl alcohol, hexyl alcohol, cyclohexyl alcohol, 2-ethylhexyl alcohol, octyl alcohol, decyl alcohol, lauryl alcohol, myristyl alcohol, palmityl alcohol, stearyl alcohol, isostearyl alcohol and oleyl alcohol;
(ii) an aromatic alcohol selected from the group consisting of phenol, methoxyphenol and naphthol;
(iii) a monoalkyl ether of mono- or poly-alkylene glycols selected from the group consisting of ethylene glycol monomethyl ether, ethylene glycol monohexyl ether, ethylene glycol monododecyl ether, ethylene glycol monostearyl ether, propylene glycol monomethyl ether, propylene glycol monohexyl ether, propylene glycol monooctyl ether, propylene glycol monododecyl ether, polyethylene glycol monododecyl ether, polyethylene glycol monomyristyl ether, polyethylene glycol monopalmityl ether and polypropylene glycol monododecyl ether; and
(iv) a mono- or di-glyceryl ether selected from the group consisting of ethyl glyceryl ether, hexyl glyceryl ether, 2-ethylhexyl glyceryl ether, octyl glyceryl ether, decyl glyceryl ether, lauryl glyceryl ether, stearyl glyceryl ether, isostearyl glyceryl ether, diglycerol monododecyl ether, and ethylene glycol monododecyl monoglyceryl ether.

9. The process for producing a polyglyceryl ether compound according to claim 1, wherein the at least one cation is a cation selected from the group consisting of a pyridinium ion, a sodium ion, and a potassium ion.

10. The process for producing a polyglyceryl ether compound according to claim 1, wherein the aluminosilicate is present during said reacting in an amount of from 0.01 to 200% by mass on the basis of the alcohol.

11. The process for producing a polyglyceryl ether compound according to claim 1, wherein said reacting is carried out a temperature of from 100 to 250° C.

12. The process for producing a polyglyceryl ether compound according to claim 9, wherein the alminosilicate is at least one zeolite selected from the group consisting of a zeolite-Y, and a mordenite zeolite.

* * * * *